(12) United States Patent
Hashimoto et al.

(10) Patent No.: US 7,468,971 B2
(45) Date of Patent: Dec. 23, 2008

(54) WIRELESS COMMUNICATION APPARATUS AND COMMUNICATION METHOD THEREOF

(75) Inventors: Takanori Hashimoto, Tokyo (JP); Teruaki Uehara, Kanagawa (JP)

(73) Assignee: Oki Semiconductor Co., Ltd. (JP)

( * ) Notice: Subject to any disclaimer, the term of this patent is extended or adjusted under 35 U.S.C. 154(b) by 409 days.

(21) Appl. No.: 11/268,594

(22) Filed: Nov. 8, 2005

(65) Prior Publication Data

US 2006/0114865 A1 Jun. 1, 2006

(30) Foreign Application Priority Data

Nov. 19, 2004 (JP) .............................. 2004-335679

(51) Int. Cl.
*H04Q 7/24* (2006.01)
(52) U.S. Cl. ......................... 370/338; 370/334; 370/445
(58) Field of Classification Search .................. 370/338
See application file for complete search history.

(56) References Cited

U.S. PATENT DOCUMENTS

2003/0169763 A1* 9/2003 Choi et al. .................. 370/462
2004/0196812 A1* 10/2004 Barber ........................ 370/334
2005/0135318 A1* 6/2005 Walton et al. ............... 370/338
2005/0239455 A1* 10/2005 Stephens .................. 455/426.2

FOREIGN PATENT DOCUMENTS

JP 2003-018170 1/2003

* cited by examiner

*Primary Examiner*—Rafael Peérrez-Gutiérez
*Assistant Examiner*—German Viana Di Prisco
(74) *Attorney, Agent, or Firm*—Studebaker & Brackett PC; Donald R. Studebaker

(57) ABSTRACT

An AP allows a CTS generator provided within a control unit to generate a self-destined, e.g., IEEE802.11b standard-based CTS signal containing a duration time corresponding to each standard. Then, the AP notifies to each STA operated based on the 11b standard in a basic service set, that it is being ready for transmission due to the transmission of the CTS signal, thereby to prohibit the operation of the corresponding STA. Further, the AP transmits a beacon based on an IEEE802.11g standard to thereby set a condition based on this standard and is caused to perform transmission/reception to and from the corresponding STA alone over the duration time indicated by the 11b standard. In a reverse case, the AP transmits a CTS signal containing a self-destined duration time under the IEEE802.11g standard to prohibit the operation of the corresponding STA based on the 11g standard. Further, the AP transmits a beacon based on the 11b standard to thereby set a condition based on this standard and is caused to perform transmission/reception to and from the corresponding station alone over the duration time indicated by the 11g standard.

6 Claims, 10 Drawing Sheets

OPERATIONAL PROCEDURE FOLLOWING FIG.3

FIG. 5

OPERATIONAL PROCEDURE FOLLOWING FIG.6

WIRELESS COMMUNICATION APPARATUS AND COMMUNICATION METHOD THEREOF

FIELD OF THE INVENTION

The present invention relates to a wireless communication apparatus and its communication method. The wireless communication apparatus of the present invention relates particularly to an access point at a wireless LAN (Local Area Network) communication system under an environment in which an IEEE (Institute of Electrical and Electronics Engineers) 802.11b standard and an IEEE802.11g standard are existent in mixed form. The wireless communication method of the present invention relates particularly to a procedure for wireless communications in an infrastructure mode of the wireless LAN communication system.

BACKGROUND OF THE INVENTION

Under a wireless LAN environment in which an IEEE802.11b standard using frequencies lying within a 2.4 GHz band and an IEEE802.11g standard having backward compatibility and providing further achievement of speeding up are existent in mixed form in a basic service set (BBS) including one access point (AP), the rate of transmission of its information is reduced. As its cause, the IEEE802.11b standard and the IEEE802.11g standard make use of the same frequency. The IEEE802.11g standard is a system developed after the IEEE802.11b standard. The IEEE802.11b standard recognizes radio waves based on the IEEE802.11g standard as noise. On the other hand, since the IEEE802.11g standard is normalized with being put emphasis on compatibility with the existing standard, it is capable of normally recognizing radio waves based on the IEEE802.11b standard. With this situation, carrier sense for confirming transmission of other terminal device in such a manner that the radio waves do not collide with each other is normally executed upon transmission of a wireless LAN. Depending upon the result of such carrier sense, transmission is started from a self terminal device. However, the terminal device of the IEEE802.11b standard is not able to recognize transmission of a terminal device of the IEEE802.11g standard. Therefore, the terminal device of the IEEE802.11b standard also starts transmission during a period in which the terminal device of the IEEE802.11g standard is in transmission. As a result, a collision occurs when they try to transmit, thus causing a reduction in transmission rate.

As described in, for example, a non-patent document 1 ("802.11 high-speed wireless LAN Text edited by Hideaki Matsue and Masahiro Morikura" issued on March, 2003, pp 75-77 and 170-171, IDG Japan Inc.), the conventional technique has solved such a collision by using a high-speed transmission mode based on the IEEE802.11g standard. This mode is used for the purpose of enhancing a transmission rate based on the IEEE802.11g standard. As described in the 170th page, Clear To Send (CTS) indicative of a transmit permission is used as this method. The CTS is a signal normally used to solve a hidden terminal problem as described in the 75th to 77th pages of the non-patent document 1. An AP or a wireless terminal (STAtion) based on the IEEE802.11g standard trying to transmit transmits CTS to a self destination according to the IEEE802.11b standard. When it transmits the CTS according to this standard, all STAs lying in the BSS, i.e., STAs based on the IEEE802.11b standard and STAs based on the IEEE802.11g standard are capable of recognizing the present CTS. In particular, STAs other than the STAs having transmitted the self-destined CTSs notify that the STAs having transmitted the self-destined CTS are ready for reception thereof. Thus, the STAs recognize the CTSs when they are trying to transmit, and put off their own transmission. Accordingly, each STA trying to transmit does not collide with other STAs and is able to transmit the CTS. Thus, the transmission rate is enhanced. According to the present method, an AP or each STA trying to transmit transmits a self-destined CTS for each packet.

Thus, the transmission rate is improved under the environment in which the terminals of the different groups capable of using the same radio channel are existent in mixed form. Therefore, there is proposed a wireless communication apparatus described in, for example, a patent document 1 (Japanese Unexamined Patent Publication No. 2003-18170) as a specific example. When the wireless communication apparatus is informed that carriers of other groups using the same radio channel has been detected upon communication with other wireless communication apparatuses using their corresponding radio channels of arbitrary radio channels, a first radio channel and a second radio channel in a predetermined radio frequency band, the wireless communication apparatus restrains and controls wireless communication means in such a manner that wireless communications with the corresponding wireless communication apparatus using the other radio channel, e.g., the transmission of carriers is brought to a halt, whereby the radio channel already in use is given priority to prevent a collision between the carriers.

Meanwhile, when the AP or STA transmits the self-destined CTS for each packet according to the existing technique, the self-destined CTS is transmitted based on the IEEE802.11b standard and hence the transmission rate is slow. Thus, when such transmission that the self-destined CTS is transmitted in plural form for each packet is taken, the present transmission can prevent collisions as compared with the normal transmission free of use of CTS and hence the transmission rate can be enhanced. However, time is taken by transmission of the self-destined CTS as overhead in addition to actual data transmission, thus resulting in inefficient transmission.

SUMMARY OF THE INVENTION

An object of the present invention is to provide a wireless communication apparatus capable of solving the drawbacks of such related arts and reducing the number of times CTS is transmitted, thereby to enhance a transmission rate, and a communication method thereof.

According to one aspect of the present invention, for attaining the above object, there is provided a wireless communication apparatus having a function of relaying data communications among stations included in a basic service set in an environment under which first and second standards of a wireless network using the same frequency band are existent in mixed form, the wireless communication apparatus comprising:

reception detecting means for detecting reception of data based on the first and second standards;

transmission detecting means for detecting transmission of the data based on the first and second standards; and control means for controlling the reception detecting means and the transmission detecting means, wherein the control means includes signal generating means for generating a self-destined transmit enabling signal including a set time based on either of the first and second standards, of transmit enabling signals, and time monitoring means for controlling generation of the self-destined transmit enabling signal, and wherein the time monitoring means includes beacon transmitting means for transmitting beacons based on the first and second standards, and time monitoring means for monitoring elapse of the set times corresponding to the first and second standards and generating and outputting transmission control signals for transmitting the beacons according to the elapse of the set times.

The wireless communication apparatus of the present invention allows the signal generating means of the control means to generate the self-destined, e.g., first standard-based transmit enabling signal containing the set time corresponding to each standard. Then, the wireless communication apparatus notifies to each station operated based on the first standard in the basic service set, that it is being ready for transmission due to the transmission of the signal, thereby to prohibit the operation of the corresponding station. Further, the wireless communication apparatus transmits the beacon based on the second standard to thereby set a communications condition based on this standard and is caused to perform transmission/reception to and from the corresponding station alone over the set time indicated by the first standard. In a reverse case, the wireless communication apparatus transmits the self-destined transmit enabling signal according to the second standard to prohibit the operation of the corresponding station based on the second standard. Further, the wireless communication apparatus transmits the beacon based on the first standard to thereby set a communications condition based on this standard and is caused to perform transmission/reception to and from the corresponding station alone over the set time indicated by the second standard. Thus, dedicated transmission periods based on the respective standards are provided and thereby the number of times a CTS signal is transmitted is reduced.

According to another aspect of the present invention, for attaining the above object, there is provided a wireless communication method for relaying data communications among stations included in a basic service set in an environment under which first and second standards of a wireless network using the same frequency band are existent in mixed form, comprising:

a first step for allowing an access point to transmit a self-destined transmit enabling signal and setting a first time corresponding to a duration time based on the first standard;

a second step for transmitting a beacon based on the second standard;

a third step for comparing and determining a measuring time subsequent to the transmission of the beacon and the first time;

a fourth step for repeating transmission and reception according to the existence of data based on the second standard until the measuring time reaches the first time;

a fifth step for transmitting a self-destined transmit enabling signal when the measuring time is greater than the first time and setting a second time corresponding to a duration time based on the second standard; a sixth step for transmitting a beacon based on the first standard;

a seventh step for comparing and determining a measuring time subsequent to the transmission of the beacon and the second time;

an eighth step for repeating transmission and reception according to the existence of data based on the first standard until the measuring time reaches the second time; and a ninth step for returning processing to the first step when the measuring time is greater than the second time.

In the wireless communication method of the present invention, the access point performs the processes for transmitting the self-destined, e.g., first standard-based transmit enabling signal, setting the first time, transmitting the beacon based on the second standard to notify a communications condition, comparing and determining the measuring time subsequent to the transmission of the beacon and the first time, repeating transmission and reception according to the existence of the data based on the second standard until the measuring time reaches the first time, transmitting the self-destined transmit enabling signal based on the second standard when the measuring time is greater than the first time, setting the second time, transmitting the beacon based on the first standard to notify a communications condition, comparing and determining the measuring time subsequent to the transmission of the beacon and the second time, repeating transmission and reception according to the existence of the data based on the first standard until the measuring time reaches the second time, and returning the processing to the first step when the measuring time is greater than the second time. Consequentially, dedicated transmission periods based on the respective standards can be provided and hence high-speed transmission can be achieved as compared with the conventional method.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 5 is a block diagram showing a schematic configuration of a second embodiment illustrative of an AP to which a wireless communication apparatus of the present invention is applied;

DETAILED DESCRIPTION OF THE PREFERRED EMBODIMENTS

Figure 1:
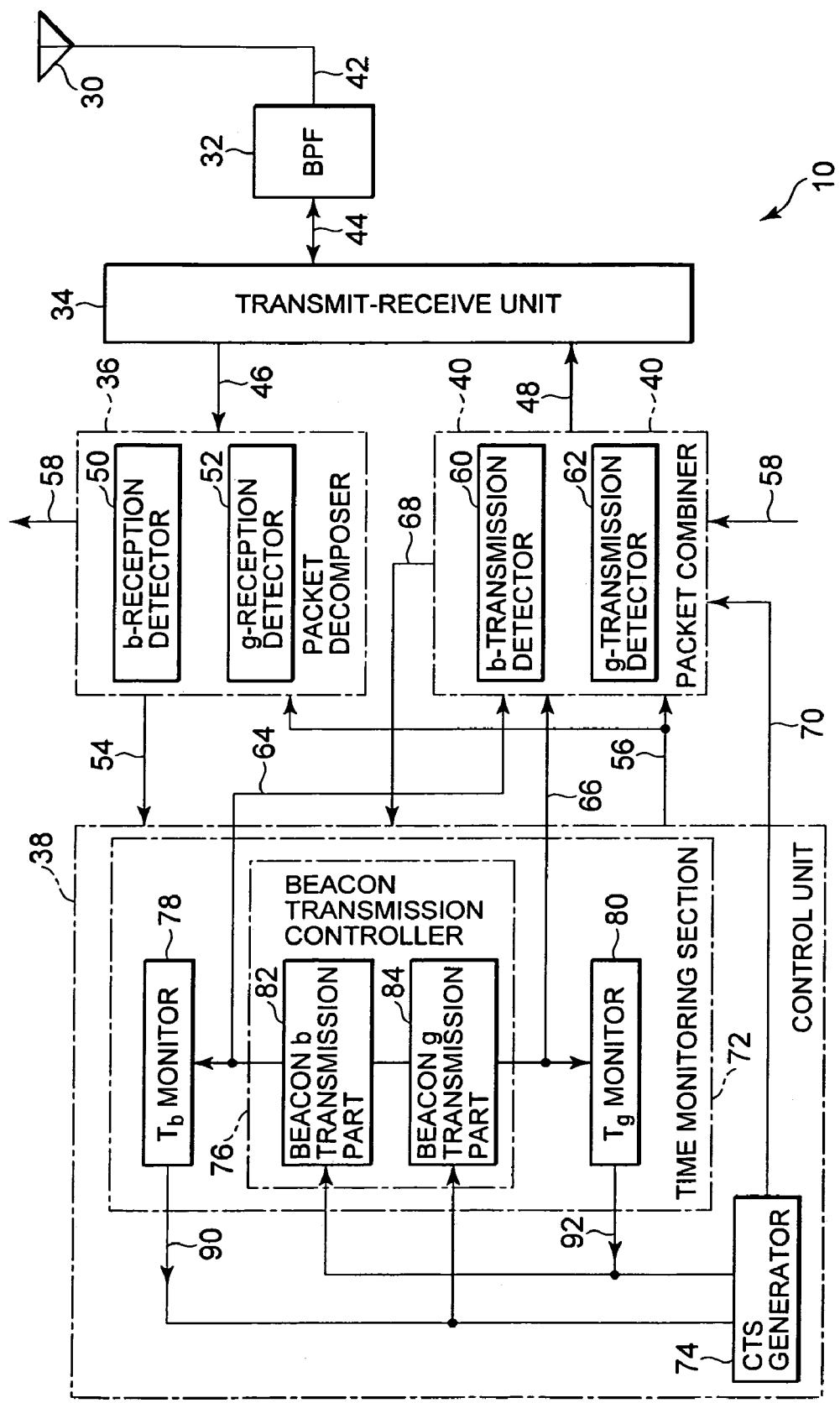
FIG. 1 is a block diagram showing a schematic configuration of a first embodiment showing an AP to which a wireless communication apparatus of the present invention is applied.

Preferred embodiments of the present invention will hereinafter be described with reference to the accompanying drawings.

First Preferred Embodiment

A first embodiment of a wireless communication apparatus according to the present invention will next be described in detail with reference to the accompanying drawings.

The present embodiment shows a case in which the wireless communication apparatus of the present invention is applied to an access point (AP) 10 in a wireless LAN system. Sections directly unrelated to the present invention will not be illustrated and described. In the following description, signals are designated at reference numerals of connecting wires that will appear below.

Figure 2:
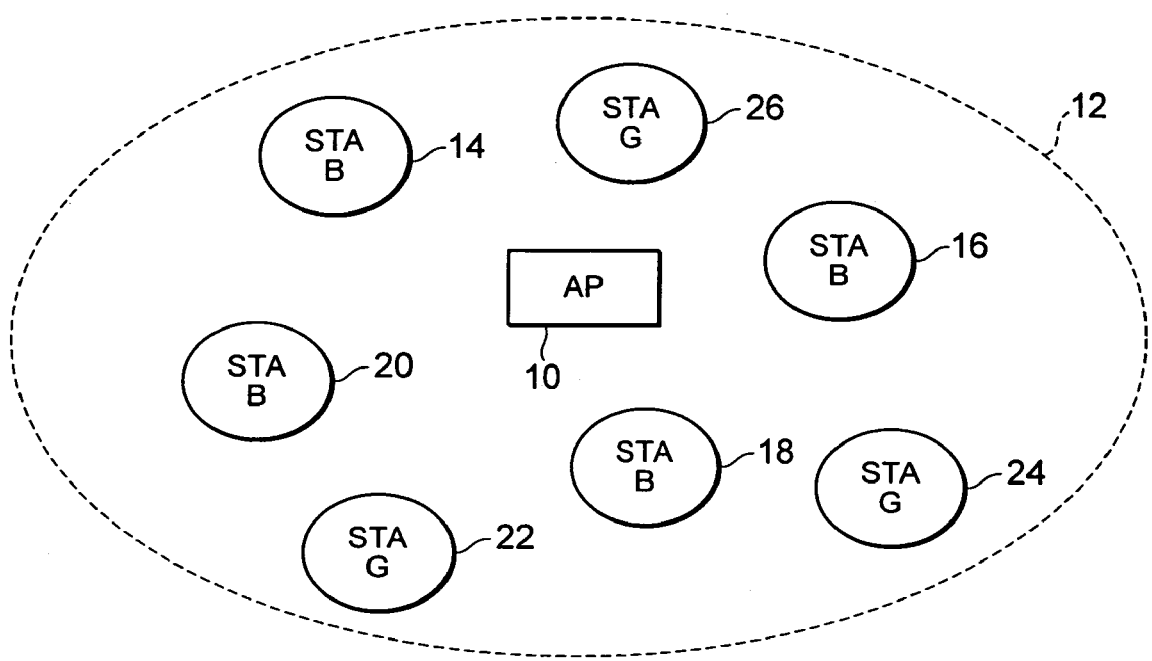
FIG. 2 is a diagram illustrating one example of a station configuration within an infrastructure BSS containing the AP shown in FIG. 1.

The AP 10 has the function of delivering information to each of stations (STAs) in the range of a basic service set (BSS) corresponding to a basic unit of a 802.11 network, which is indicated by a broken line 12 as shown in FIG. 2. That is, the AP 10 has a relaying function of the network which communicates in an infrastructure mode.

STAs B 14, 16, 18 and 20 respectively indicate wireless terminal devices or computers each having a network interface and are operated according to an IEEE802.11b standard. STAs B 22, 24 and 26 also respectively indicate wireless terminal devices or computers each having a network interface and are operated according to the IEEE802.11g standard.

A wireless LAN according to the present embodiment is an infrastructure BSS in which the AP 10 and at least STAs B and G exist one by one.

As shown in FIG. 1, the AP 10 includes an antenna 30, a BPF 32, a transmit-receive unit 34, a packet decomposer 36, a control unit 38 and a packet combiner 40. The antenna 30 has the function of receiving incoming radio waves therein and outputting a transmit signal outputted from the transmit-receive unit 34 as radio waves and supplies a receive signal 42 to the transmit-receive unit 34 through a transmission line for fixed gain.

The BPF 32 is band-limited and obtains a receive signal for a frequency channel to be used. The BPF 32 employed in the present embodiment is a band limit filter which allows a frequency band 2.4 GHz based on the IEEE802.11b/g standards to selectively pass therethrough. The BPF 32 supplies a band-limited receive signal 44 to the transmit-receive unit 34.

The transmit-receive unit 34 has front end functions for transmission and reception based on the IEEE802.11b/g standards. That is, the transmit-receive unit 34 has the function of down-converting the receive signal 44 upon reception based on each of the IEEE802.11b/g standards and demodulating the receive signal 44 from a carrier to obtain a demodulated receive signal 46 and the function of modulating a transmit signal 48 supplied at transmission to a carrier, up-converting it and outputting a transmit signal 44. The transmit-receive unit 34 outputs the receive signal 46 to the packet decomposer 36 and inputs the transmit signal 48 from packet combiner 40, respectively, at baseband.

The packet decomposer 36 has the function of determining whether the supplied receive signal 46 is of a packet and to which packet the receive signal 46 corresponds. In the present embodiment, the packet decomposer 36 includes a b-reception detector 50 and a g-reception detector 52. The b-reception detector 50 has the function of detecting whether the receive signal 46 has data on IEEE802.11b. The g-reception detector 52 has the function of detecting whether the receive signal 46 has data on IEEE802.11g. When either one of the b-reception detector 50 and the g-reception detector 52 detects data of b/g, the packet decomposer 36 outputs a notice signal 54 indicative of which data of standard has been detected, to the control unit 38. The packet decomposer 36 analyzes the receive signal 46 according to, for example, a control signal 56 outputted from the control unit 38 and outputs it as a receive signal 58.

The packet combiner 40 has the function of rewriting a source IP address and a port number contained in a header of a packet corresponding to a transmit signal 58 for a client and a server via NAT (Network Address Translation) and also has the function of combining, i.e., reconstructing packets to be transmitted. The packet combiner 40 is supplied with a beacon signal 64 based on the IEEE802.11b standard and a beacon signal 66 based on the IEEE802.11g standard respectively from the control unit 38. In the present embodiment, the packet combiner 40 includes a b-transmission detector 60 and a g-transmission detector 62. The b-transmission detector 60 has the function of detecting whether it has transmit data based on the IEEE802.11b standard. The g-transmission detector 62 has the function of detecting whether it has transmit data based on the IEEE802.11g standard. When either one of the b-transmission detector 60 and the g-transmission detector 62 detects the existence of the transmit data of b/g, the packet combiner 40 outputs a notice signal 68 indicative of which data of standard has been detected, to the control unit 38. The packet combiner 40 is supplied with a CTS signal 70 from the control unit 38. The packet combiner 40 allocates information supplied from the control unit 38 in response to the control signal 56 to predetermined regions of the packet and combines the information, and outputs the combined packet as a transmit signal 48.

An unillustrated baseband processor including the packet decomposer 36 reads a protocol number of an IP (Internet Protocol) header contained in a packet from a client to thereby determine whether it corresponds to a TCP (transmission Control Protocol) packet or a UDP (User Datagram Protocol) packet. The baseband processor reads a TCP header too and makes a decision as to the presence or absence of a request for the establishment of connection. The AP 10 also has the function of creating tables for mapping two communication flows divided into the client side and the server side and holding the same. Further, the AP 10 also has the function of connecting communications on the client and server sides by means of an interprocess communication.

The control unit 38 has the function of controlling all the APs 10. The control unit 38 employed in the present embodiment is characterized in that it includes a time monitoring section 72 and a CTS generator 74. The time monitoring section 72 includes a beacon transmission controller 76, a Tb monitor 78 and a Tg monitor 80. The beacon transmission controller 76 has the function of controlling the delivery of beacons based on the IEEE802.11 standards from the AP 10. The beacon transmission controller 76 includes a beacon b transmission part 82 and a beacon g transmission part 84 which generate beacons according to their corresponding standards in response to this control and send out the generated beacons to supply destinations, respectively. The beacon b transmission part 82 and the beacon g transmission part 84 respectively supply the generated beacon b 64 and beacon g 66 to the packet combiner 40 as sending beacons for the AP 10. The beacon b transmission part 82 supplies the beacon b 64 even to the Tb monitor 78, and the beacon g transmission part 84 supplies the beacon g 66 even to the Tg monitor 80.

The Tb monitor 78 has the function of monitoring the elapse of a set time Tb supplied in advance. The Tb monitor 78 starts the monitoring of a lapse of time depending upon the reception of the beacon 11b 64. The Tb monitor 78 outputs a control signal 90 to the CTS generator 74 according to the decision that the time to be measured has reached the time Tb. The Tg monitor 80 also has the function of monitoring the elapse of a set time Tg supplied in advance. The Tg monitor 80 starts monitoring a lapse of time depending on the reception of the beacon 11g 66. The Tg monitor 80 outputs a control signal 92 to the CTS generator 74 according to the decision that the time to be measured has reached the time Tg.

Now, the times Tb and Tg respectively indicate duration times based on the IEEE802.11b and 11g standards, which are contained in the CTS signal 70.

The CTS generator 74 has the function of generating the CTS signal 70. In the high-speed transfer of the present embodiment, which will be described in a later stage, the CTS signal 70 generated by the CTS generator 74 is transmitted to itself or a self destination. Here, the CTS signal 70 contains a CTS frame, and a transmission time corresponds to a time interval taken until a transmission prohibiting period written in a duration field of a frame received upon execution of carrier sense is completed after idle time is reached. In the case of the normal data frame, the transmission prohibiting period is called "NAV (Network Allocation Vector) time".

Figure 3:
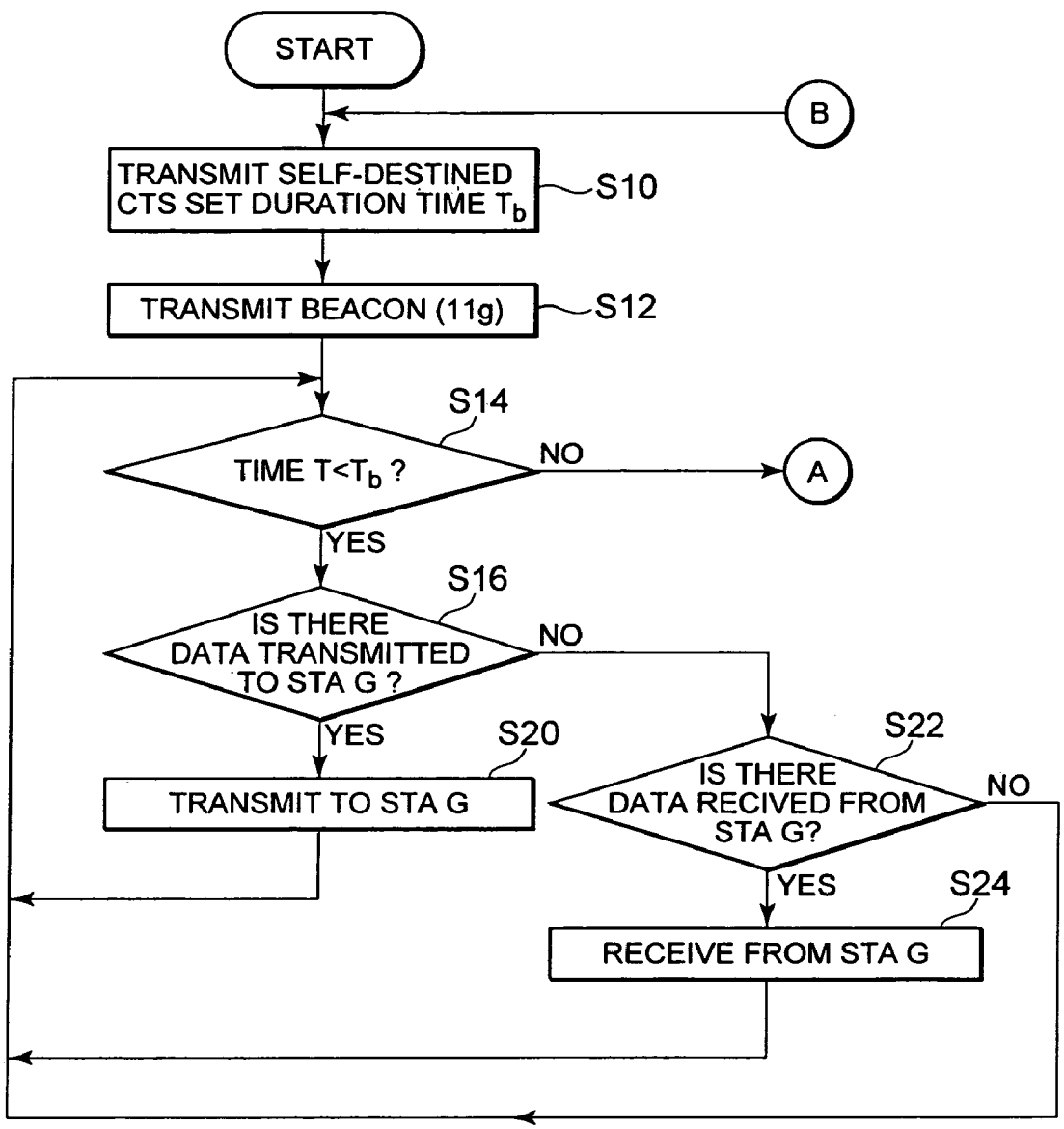
FIG. 3 is a flowchart for describing an operational procedure for high-speed transmission at the AP shown in FIG. 1.

A description will next be made briefly of a case in which the AP 10 transfers data, i.e., a packet at high speed. The present embodiment corresponds to the case in which the duration times Tb and Tg are respectively set to the same time. Each of the duration times is equivalent to a value (period) described in a duration field lying within a self-destined CTS. The AP 10 is set to a high-speed transmission mode of IEEE802.11g. Upon this setting, the AP 10 generates a self-destined CTS based on the IEEE802.11b standard and transmits it therefrom as shown in FIG. 3 (Step S10). Thus, a time Tb is set to the AP 10. Within the BSS range 12 in which the CTS has been transmitted in this way, all the STAs each based on the IEEE802.11b standard judge that the AP 10 is trying to start transmitting, and extends or puts off its own transmission over a period of duration time Tb. As a result, this extension is equivalent to prohibition of transmission based on the IEEE802.11b standard. Since each STA based on the IEEE802.11g standard is placed in the high-speed transmission mode at this time, the AP 10 does not recognize radio waves transmitted under the IEEE802.11b standard and carries out the normal transmission. With this transmission, the AP 10 sets the above duration time Tb as an occupied period of IEEE802.11g. Accordingly, the STAs G placed within the BSS range 12 shown in FIG. 2 are capable of transmission.

Figure 4:
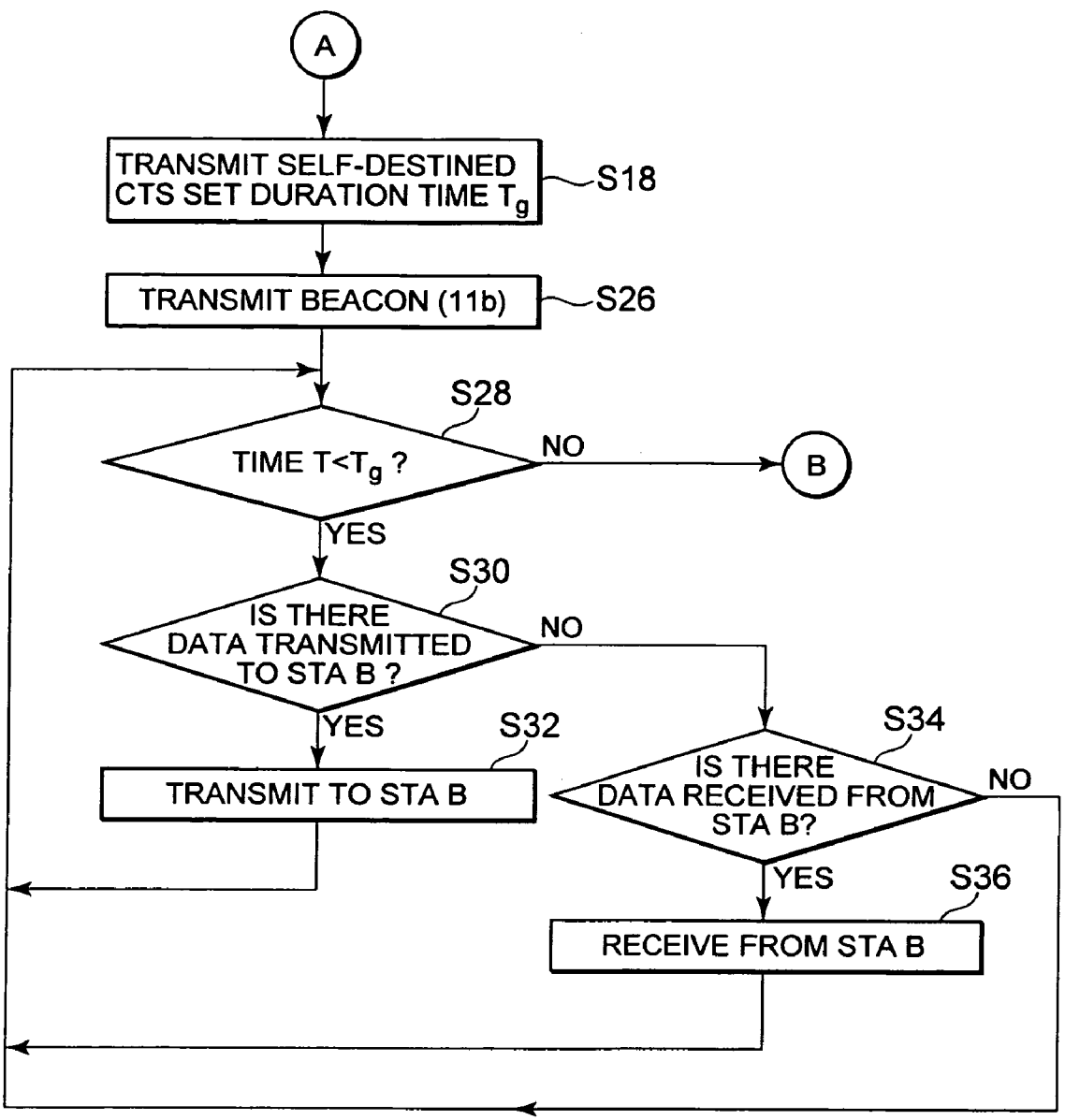
FIG. 4 is flowchart for describing an operational procedure following FIG. 3.

Next, the AP 10 transmits a beacon 11g 66 (Step S12). The beacon 11g 66 contains notice information based on the IEEE802.11g standard. Thus, the AP 10 prevents reception of the IEEE802.11b standard. Next, the AP 10 monitors the elapse of the occupied time Tb (Step S14). When the time to be measured is found to be shorter than the time Tb (when the answer is found to be YES), the AP 10 determines that it falls within the occupied time and proceeds to a process for making a decision as to the presence or absence of transmit data (to Step S16). When the time to be measured is found to be longer than the time Tb (when the answer is found to be NO), the AP 10 judges that the elapse of the occupied time has been made, and proceeds to such a self-destined CTS transmission as shown in FIG. 4 via a connection binder A (to Step S18).

It is determined whether the transmit data relative to each of the STAs G lying within the BSS range 12 exists (Step S16). The g-transmission detector 62 measures the presence or absence of the transmit data. When the result of measurement indicates the presence of the transmit data (when the answer is found to be YES), the AP 10 proceeds to a transmitting process (to Step S20). When the result of measurement indicates the absence of the transmit data (when the answer is found to be NO), the AP 10 proceeds to a process for determining the presence or absence of receive data (to Step S22). The transmitting process is performed so as to allow the packet combiner 40 to add a header to the transmit data 58 and transmit it by radio waves via the transmit-receive unit 34, the BPF 32 and the antenna 30.

In the process for determining the presence or absence of the receive data, the g-reception detector 52 measures the presence or absence thereof. When the result of measurement indicates the presence of the receive data (when the answer is found to be YES), the AP 10 proceeds to a receiving process (to Step S24). When the result of measurement indicates the absence of the receive data (when the answer is found to be NO), the AP 10 returns to the process for monitoring the occupied time Tb (to Step S14). In the receiving process (Step S24), the receive signal 46 based on the IEEE802.11g standard is packet-decomposed and temporarily-received data is stored and held.

On the other hand, when the elapse of the occupied time Tb is made, the AP 10 generates a self-destined CTS based on the IEEE802.11g standard and transmits it (Step S18). Hence, a time Tg is set to the AP 10. Thus, all the STAs G lying within the BSS range 12 judge that the AP 10 is trying to transmit, and extends or puts off its own transmission over a period of duration time Tg. At this time, each STA B lying within the BSS range 12 is not capable of recognizing the self-destined CTS modulated based on the IEEE802.11g standard, and judges its transmission to be noise and sets the duration time Tg. Thus, all of the STBs B located within the range can perform normal transmission.

Next, the AP 10 transmits a beacon 11b 64 (Step S26). With the transmission of notice information under the standard of the 11b, the AP 10 prevents reception of the IEEE802.11g standard. Next, the AP 10 monitors the elapse of an occupied time Tg (Step S28). When the time to be measured is found to be shorter than the time Tg (when the answer is found to be YES), the AP 10 determines that it falls within the occupied time and proceeds to a process for making a decision as to the presence or absence of transmit data (to Step S30). When the time to be measured is found to be longer than the time Tg (when the answer is found to be NO), the AP 10 judges that the elapse of the occupied time has been made, and returns to such self-destined CTS transmission as shown in FIG. 3 via a connection binder B (to Step S10).

It is determined whether the transmit data relative to each of the STAs B lying within the BSS range 12 exists (Step S30). The b-transmission detector 60 measures the presence or absence of the transmit data. When the result of measurement indicates the presence of the transmit data (when the answer is found to be YES), the AP 10 proceeds to a transmitting process (to Step S32). When the result of measurement indicates the absence of the transmit data (when the answer is found to be NO), the AP 10 proceeds to a process for determining the presence or absence of receive data (to Step S34). The transmitting process is performed so as to allow the packet combiner 40 to add a header to the transmit data 58 and transmit it by radio waves via the transmit-receive unit 34, the BPF 32 and the antenna 30.

In the process (Step S34) for determining the presence or absence of the receive data, the b-reception detector 50 measures the presence or absence thereof. When the result of measurement indicates the presence of the receive data (when the answer is found to be YES), the AP 10 proceeds to a receiving process (to Step S36). When the result of measurement indicates the absence of the receive data (when the answer is found to be NO), the AP 10 returns to the process for monitoring the occupied time Tg (to Step S28). In the receiving process (Step S36), the receive signal 46 based on the IEEE802.11b standard is packet-decomposed and thereby temporarily-received data is stored and held.

By allowing only the AP 10 to transmit the self-destined CTS in this way and causing the AP 10 to simply transmit one self-destined CTS during a period set by a user in a duration field without transmitting the self-destined CTS for each packet in a manner that already exists above, the number of times the self-destined CTSs are transmitted can be reduced than conventional, and collision-free and efficiency-improved transmission is allowed with the IEEE802.11b and 11g standards being divided on a time basis. And the AP 10 is provided with the dedicated transmission periods based on the respective standards, reduces the number of times the CTS signal 70 is transmitted, without transmitting the CTS signal for each packet and transmits the beacon according to the IEEE802.11g standard to send the control frame thereby to achieve transmission faster than the conventional low rate transmission of IEEE802.11b standard, thus making it possible to improve a transmission rate.

Second Preferred Embodiment

A second embodiment of an AP 10 to which a wireless communication apparatus of the present invention is applied, will next be explained. In the following embodiments, constituent elements common to those employed in the previous embodiment are given the same reference numerals, and their description will be omitted to avoid the complication of explanation.

Figure 5:
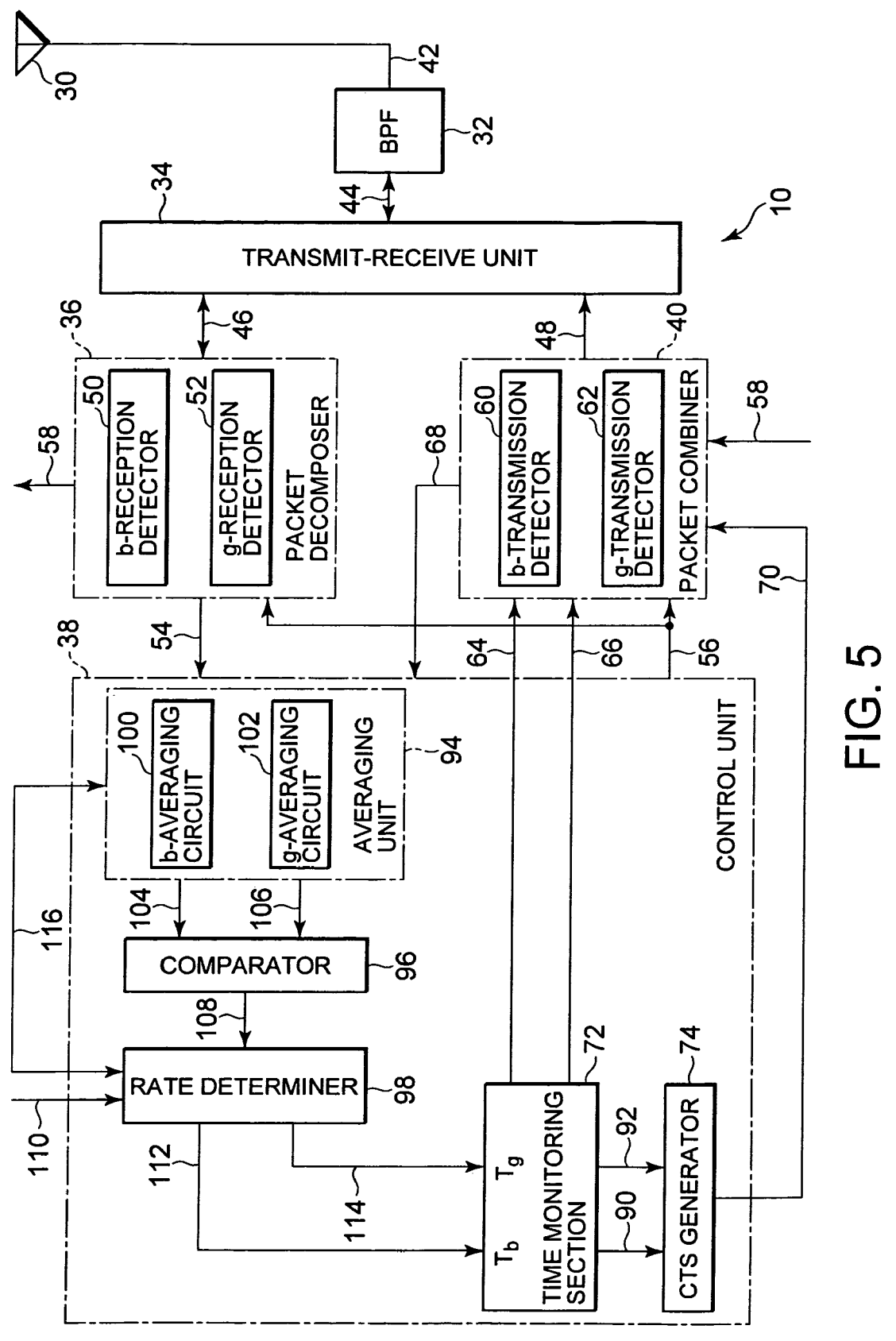

The present embodiment is characterized in that it has a control unit 38 which variably sets duration times Tb and Tg based on IEEE802.11b and 11g standards, monitors the times and controls the operation of the AP 10. To realize it, the control unit 38 includes an averaging unit 94, a comparator 96 and a rate determiner 98 as well as having a time monitoring section 72 and a CTS generator 74 as shown in FIG. 5. The averaging unit 94 has the function of adding up or integrating times required for transmission/reception of 11b and 11g using notice signals 54 and 68 supplied thereto and calculating the average thereof. The averaging unit 94 has a b-averaging circuit 100 and a g-averaging circuit 102. The averaging divides the integrated times by times set in advance to calculate a ratio. Upon the averaging in the present embodiment, time-reflected transmit-receive data amounts are used and added up or integrated to determine an averaged transmit-receive data amount per beacon time, and the determined transmit-receive data amount is used as a time rate. A suitable time may preferably range from 20 to 50 beacon times, and the time to be set makes use of one beacon time in this range. A variable indicative of this time is CYC_NUM to be described later. The averaging unit 94 outputs ratios 104 and 106 calculated by the b-averaging circuit 100 and the g-averaging circuit 102 to the comparator 96.

The comparator 96 has the function of determining the magnitudes of the supplied ratios by comparison and outputting the result of determination by comparison and the difference between the ratios. The comparator 96 supplies information 108 indicative of the result thereof and the difference therebetween to the rate determiner 98.

The rate determiner 98 has the function of setting beacon times for 11b and 11g according to the supplied information 48. Although not shown in the figure, a register is prepared for the rate determiner 98. The register is supplied with information 110 and retains it therein. The information 110 contains an initial rate value, the maximum value and the minimum value. When the difference between the ratios, i.e., the rate to be used becomes wider than a predetermined value, the rate determiner 98 increases a time interval for communication large in use rate, which is indicated by the result of determination by comparison, to a predetermined amount and decreases a time interval for communication small in use rate to a predetermined amount. However, the rate determiner 98 limits one communication to the minimum value such that it does not reach zero, and limits the other communications to the maximum value such that they all do not reach zero. The rate determiner 98 outputs times Tb 112 and Tg 114 corresponding to the rates based on the IEEE802.11b and 11g to the time monitoring section 72. Further, the rate determiner 98 outputs a reset signal 116 for resetting the respective average values of the averaging unit 94 in response to the outputs referred to above. The time monitoring section 72 outputs control signals 90 and 92 to the CTS generator 74 according to respective comparisons between the times Tb and Tg set thereto and measuring times.

The operation of the AP 10 according to the present embodiment will next be explained. Operations common even to the following operations containing the operation of the present embodiment are given the same reference numerals as those in the previous embodiment, that is, step numbers, and their description will be omitted. This operational procedure will be described with reference to FIGS. 6 through 8.

Figure 6:
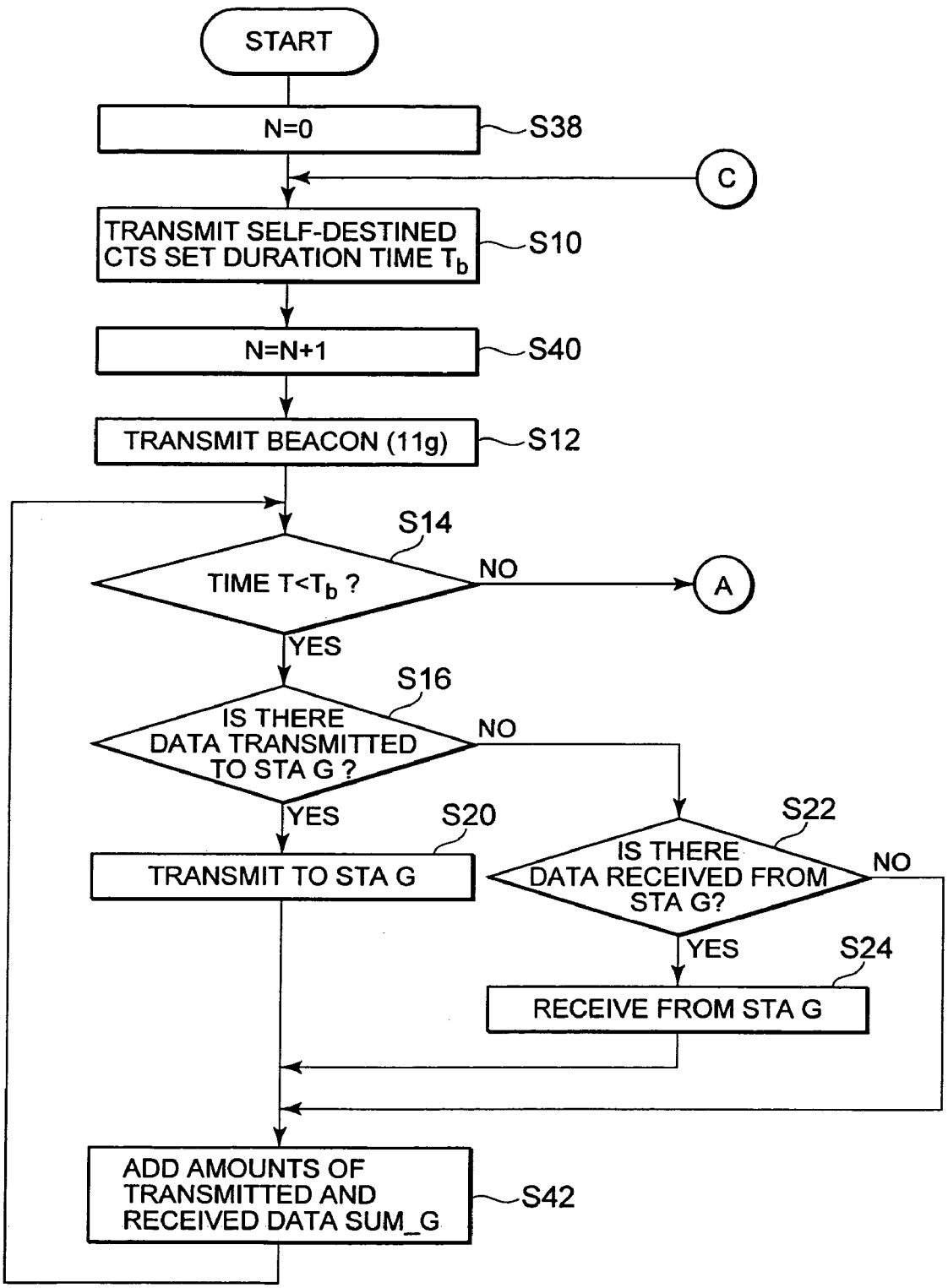
FIG. 6 is a flowchart for describing an operational procedure for high-speed transmission at the AP shown in FIG. 5.

In FIG. 6, the value of a variable N indicative of the number of durations is first set to zero (Step S38). Next, the AP 10 transmits a self-destined CTS (Step S10). Thereafter, the AP 10 increments the value of the variable N by +1 (Step S40). Next, the AP 10 transmits a beacon 11g (Step S12). Next, the AP 10 monitors the elapse of an occupied time Tb (Step S14). When the time to be measured is shorter than the time Tb (when the answer is found to be YES), the AP 10 judges that it falls within the occupied time and proceeds to a process for making a decision as to the presence or absence of transmit data (to Step S16). When the time to be measured is longer than the time Tb (when the answer is found to be NO), the AP 10 judges that the elapse of the occupied time has already been made, and proceeds to such self-destined CTS transmission as shown in FIG. 7 via a connection binder A (to Step S18).

When the occupied time Tb is not reached, the AP 10 judges the presence or absence of transmit data to each STA G and the presence or absence of receive data from each STA G respectively (Steps S16 and S22). The AP 10 transmits and receives the transmit and receive data depending upon their existence (Steps S20 and S24). Thereafter, the AP 10 integrates or adds the amounts of the transmitted and received data (Step S42). A variable indicative of summation or integration corresponds to SUM_G. After its summation, the AP 10 returns to time monitoring (to Step S14).

Figure 7:
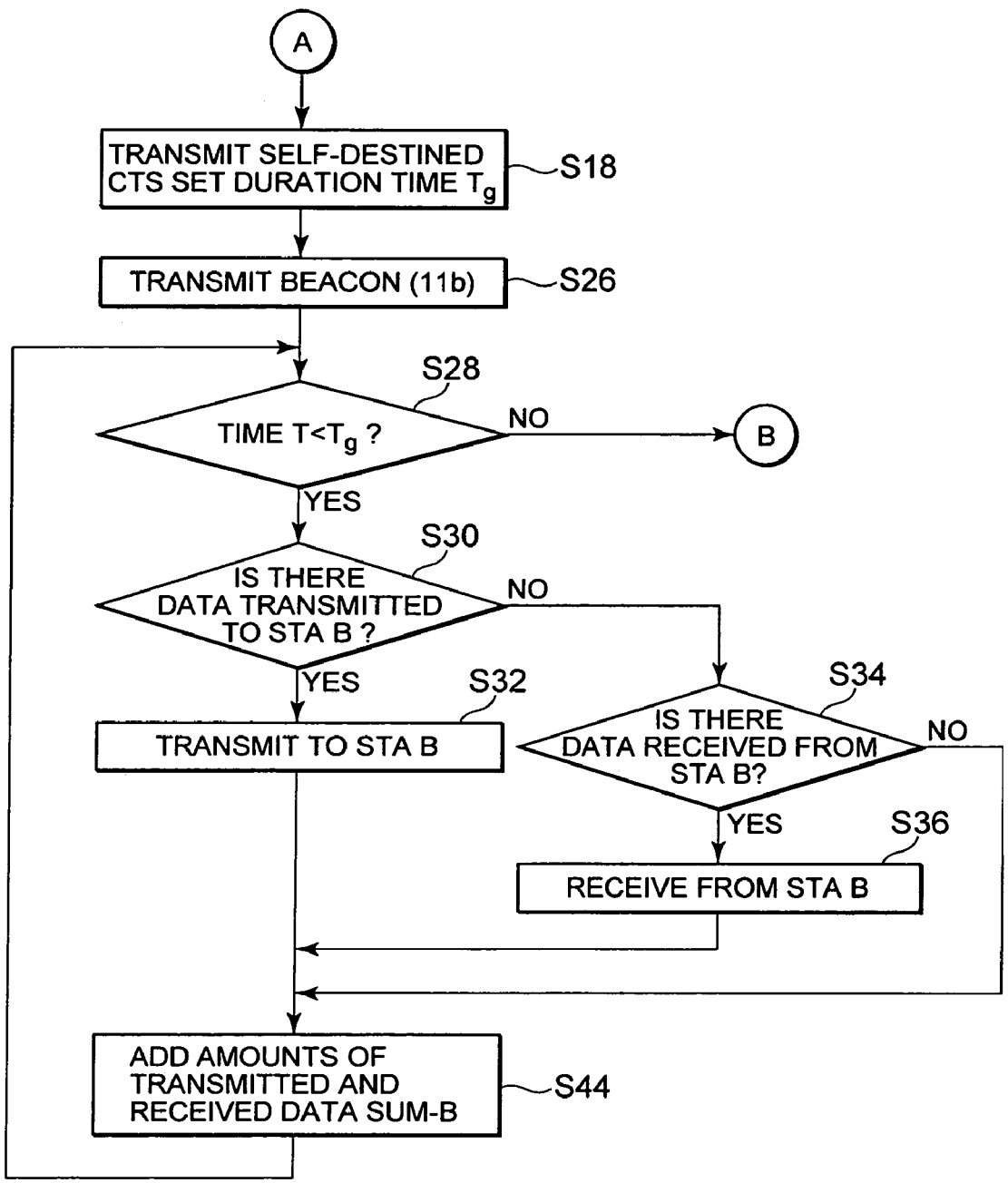
FIG. 7 is a flowchart for describing an operational procedure following FIG. 6.

Next, the AP 10 proceeds to FIG. 7 via the connection binder A and transmits a self-destined CTS (Step S18). Next, the AP 10 transmits a beacon 11*b* (Step S26) and performs time monitoring (Step S28). If the duration time Tg is not reached, then the AP 10 judges the presence or absence of transmit data to each STA B and the presence or absence of received data from each STA B respectively (Steps S30 and S34), and transmits and receives the transmit and receive data depending upon their existence (Steps S32 and S36). Thereafter, the AP 10 integrates or adds the amounts of the transmitted and received data (Step S44). A variable indicative of summation or integration corresponds to SUM_B. After its summation, the AP 10 returns to the time monitoring (to Step S28).

Figure 8:
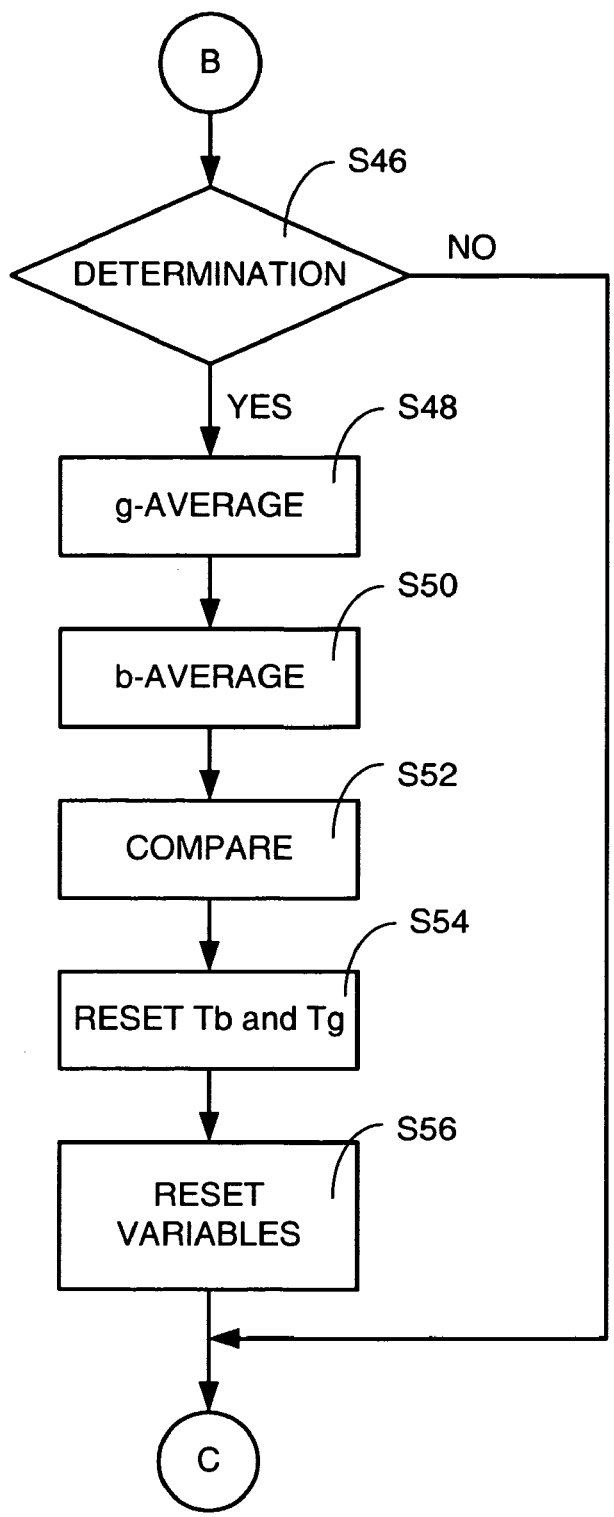
FIG. 8 is a flowchart for describing an operational procedure following FIG. 7.
Figure 9:
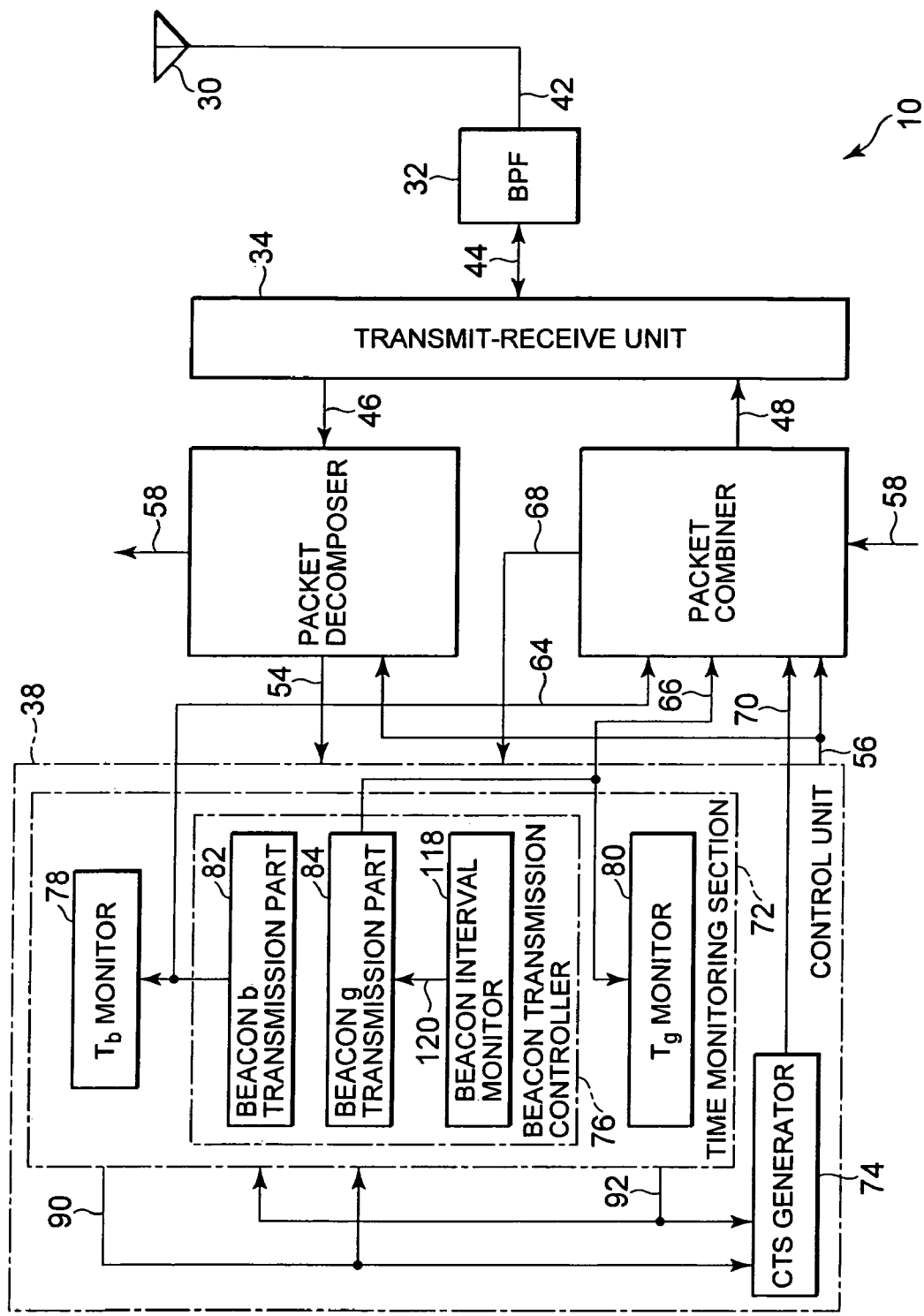
FIG. 9 is a block diagram showing a schematic configuration of a third embodiment illustrative of an AP to which a wireless communication apparatus of the present invention is applied.
Figure 10:
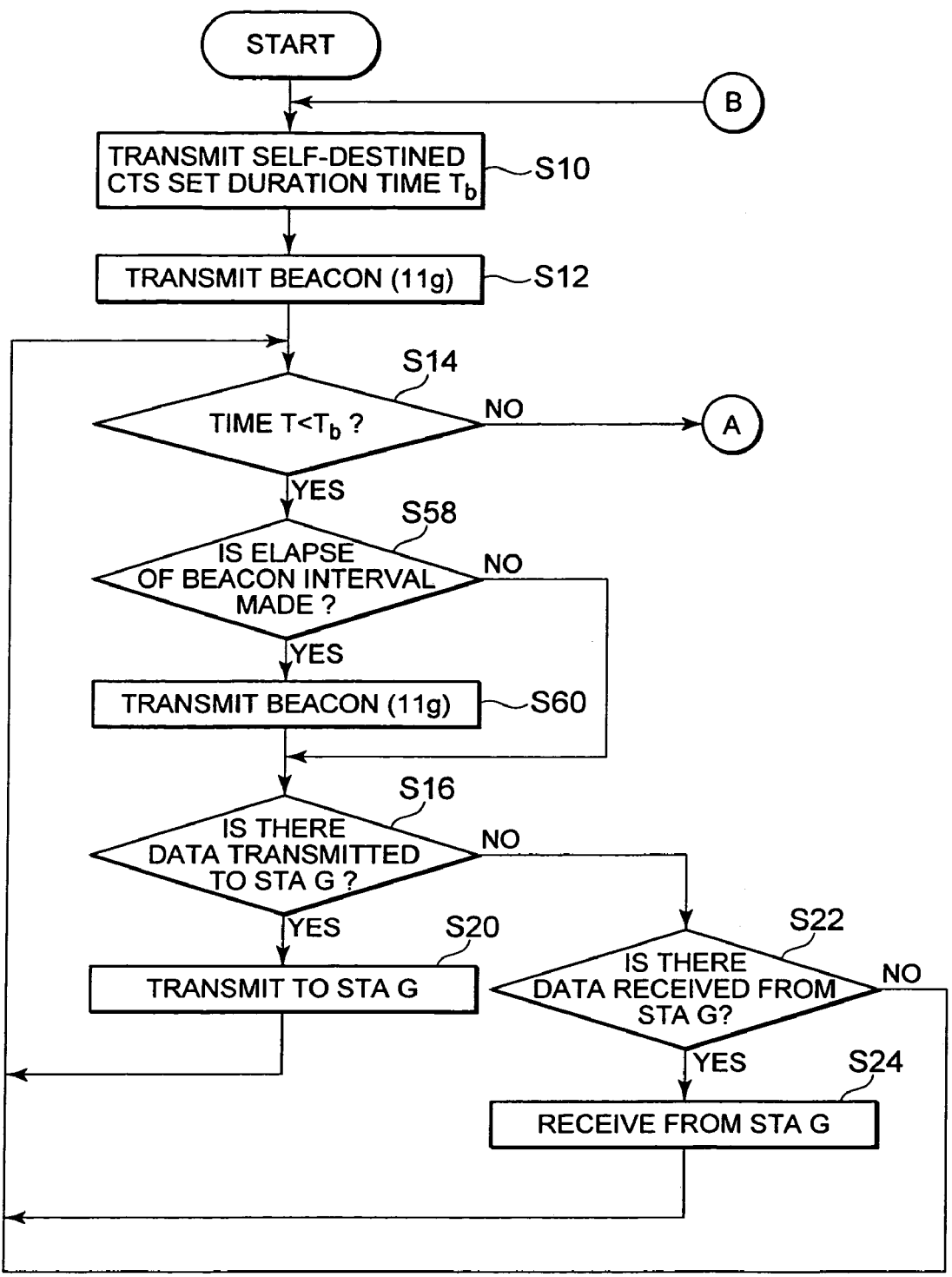
FIG. 10 is a flowchart for describing an operational procedure for high-speed transmission at the AP shown in FIG. 9.

If the duration time Tg is reached upon the previous time monitoring, the AP 10 proceeds to such a determining process as shown in FIG. 8 via a connection binder B (to Step S46). This determining process is used to determine whether the repetition of a predetermined number of times CYC_NUM set in advance for averaging is completed (Step S46). When the determining process is not completed (when the answer is found to be NO), the AP 10 returns to the process for transmitting the self-destined CTS shown in FIG. 6 via a connection binder C and repeats the process referred to above. When the determining process is completed (when the answer is found to be YES), the AP 10 proceeds to a g-averaging process (to Step S48).

Upon the g-averaging process, the variable SUM_G integrated up to now by the averaging unit 94 is divided by N to obtain a data amount per duration time based on the IEEE802.11b standard as an average (Step S48). Upon the b-averaging process, the variable SUM_B integrated up to now is next divided by N to obtain a data amount per duration time based on the IEEE802.11b standard as an average (Step S50). Next, the AP 10 compares the respective obtained data amounts per duration time (Step S52). Upon the comparison, the AP 10 converts a data amount to be handled to e.g., a time rate or an occupied time and supplies the difference between a large time rate and the determined time rate to the rate determiner 98 as information 108.

Next, the rate determiner 98 re-sets the times Tb and Tg on the basis of the information 108 supplied thereto (Step S54). Now, the AP 10 operates at the initial rate value until their resetting is made. When the difference contained in the supplied information 108 is larger than a predetermined value, the resetting is performed so as to increase a communications time large in use rate to a predetermined amount and decrease a communication time small in use rate to a predetermined amount. Described specifically, when a difference of 20% or more exists in the use rate, the large time rate is increased by 10% and the small time rate is decreased by 10%. If the result that the initial rate value relative to each of the IEEE802.11b/11g is set to 50% and the IEEE802.11b is 20% and the IEEE802.11g is 80% by averaging and comparison, is obtained, then the rate determiner 98 outputs times Tb 112 and Tg 114 that the IEEE802.11b is brought to 40% and the IEEE802.11g is brought to 60%, to the time monitoring section 72. After such processing, the time monitoring section 72 re-sets times supplied thereto. Next, the variables N, SUM_G and SUM_B are respectively reset to zero and the processing is returned to such self-destined CTS transmission as shown in FIG. 6 via a connection binder C (to Step S10).

By allowing the AP 10 to operate in this way, the duration times are allocated depending upon the frequency of use, thus enabling high-speed transmission thereof according to the settings appropriate to the use of a user.

Third Preferred Embodiment

A third embodiment of an AP 10 to which a wireless communication apparatus of the present invention is applied, will next be explained. In a manner similar to the previous embodiment, the AP 10 according to the present embodiment is also characterized by a control unit 38. The control unit 38 includes a beacon interval monitor 118 located within a beacon transmission controller 76. That is, in the present embodiment, assuming that a beacon interval between IEEE802.11b and 11g differ like 2:1, for example, the ratio in number between the IEEE802.11b and 11g reaches 1:2 where it is expressed in the ratio between the numbers of beacons transmitted. In the present embodiment, a period longer than one packet is inputted as a period in which a user intends to perform high-speed transmission, and it is reflected on a duration field.

The beacon interval monitor 118 has the function of outputting a control signal 120 to a beacon g transmission part 84 according to whether a beacon interval based on a standard different from the normal one with respect to a beacon interval set in advance, in the present embodiment, the IEEE802.11g standard has reached a measuring time. Although the beacon interval monitor 118 has controlled the beacon interval of the beacon g transmission part 84 in the present embodiment, a beacon b transmission part 82 may control it where the beacon interval is different from the normal one.

When a high-speed transmission mode is started up, there is a possibility that a first CTS and a transmit signal from each STA lying within a BSS range 12 will collide with each other due to a period in which the standards are existent in mixed form. Now consider that the AP 10 transmits the first CTS according to the IEEE802.11b standard. Originally, each STA G based on the IEEE802.11g standard must perform carrier sense and thereby recognize that the AP 10 is transmitting CTS and stop its transmission. It is however defined that the STAs should not recognize the IEEE802.11b standard and the IEEE802.11g standard each other. Thus, each STA G based on the IEEE802.11g standard is not capable of recognizing a self-destined CTS transmitted by the AP 10 according to the IEEE802.11b standard. Accordingly, the STA G cannot execute carrier sense, causing a possibility that the CTS and a transmit signal of the STA G will collide with each other and hence be retransmitted, whereby transmission efficiency is reduced.

Meanwhile, in the high-speed transfer mode of the present embodiment, there is merely a possibility that the transmit signal will collide with the first CTS. After the high-speed transfer mode has been started, no collision occurs. The collision of the first CTS with the STA transmit signal is a loss meaningless upon high-speed transmission, and the probability of their collision is low. Further, although there is a possibility that they will collide even upon normal transmission at the time that such high-speed transmission is not used, the efficiency of transmission can be improved by carrying out the high-speed transmission and eliminating the collision. As in the present embodiment in particular, the beacon interval based on the IEEE802.11g standard is set half and the AP 10 is operated in this condition. Thus, since a control frame can be transmitted at high speed, a transmission rate can be enhanced as compared with the conventional low rate transmission based on the IEEE802.11b standard.

The operation of the AP 10 according to the present embodiment will be explained briefly. The AP 10 is identical to FIGS. 3 and 4 in basic operation. A beacon interval elapse determining process (Step S58) and a beacon 11g transmitting process (Step S60) are provided between a time monitoring process (Step S14) and a process for determining the presence or absence of transmit data of each STA G. When the time of a beacon interval have not elapsed (when the answer is found to be NO), the elapse determining process proceeds to the process for determining the presence or absence of the transmit data relative to the STA G (to Step S16) according to a procedure similar to one used up to now. When the time of the beacon interval has already elapsed (when the answer is found to be YES), the beacon 11g transmitting process is performed.

It is thus possible to set a beacon interval based on the IEEE802.11g standard, which is shorter than a duration time Tb based on the IEEE802.11b standard and use high-speed transmission during the duration time Tb. Hence a transmission rate can be improved.

With the provision of such a configuration as described above, the AP 10 allows a CTS generator 74 lying within a control unit 38 to generate a self-destined CTS signal 70 based on the IEEE802.11b standard, for example, containing the duration time Tb corresponding to each standard. Then, the AP 10 notifies to each STA operated based on the 11b standard in the basic service set, that it is being ready for transmission due to the transmission of the signal 70, thereby to prohibit the operation of the corresponding STA. Further, the AP 10 transmits a beacon 66 based on the IEEE802.11g standard to thereby set a condition based on this standard and is caused to perform transmission/reception to and from the corresponding STA alone over the duration time Tb indicated by the 11b standard. In a reverse case, the AP 10 transmits a CTS signal 70 containing a self-destined duration time Tg under the IEEE802.11g standard to prohibit the operation of the corresponding STA based on the 11g standard. Further, the AP 10 transmits a beacon 64 based on the 11b standard to thereby set a condition based on this standard and is caused to perform transmission/reception to and from the corresponding station alone over the duration time Tg indicated by the 11g standard. Consequently, the dedicated transmission periods based on the respective standards are provided, and the number of times the CTS signal 70 is transmitted is reduced without transmitting the CTS signal for each packet. Further, the beacon is sent according to the IEEE802.11g standard to transmit a control frame. Thus, the high-speed transmission based on the 11g standard is enabled as compared with the conventional low rate transmission of IEEE802.11b standard, whereby the transmission rate can be enhanced.

In the control unit 38, an averaging unit 94 averages times used for transmission/reception under the IEEE802.11b and 11g standards respectively. A comparator 96 determines by comparison whether either one of the averaged transmission/reception times 104 and 106 is large and obtains the difference therebetween as comparative information 108. A rate determiner 98 increases and decreases the comparative information 108 at a predetermined rate relative to the present rate depending upon whether the comparative information 108 is larger than a predetermined value, thereby to decide respective set times 112 and 114. Then, the rate determiner 98 outputs the set times to a time monitoring section 72. Thus, dedicated transmission periods based on the respective standards are provided and hence the number of times the CTS signal 70 is transmitted is reduced. Further, duration times set to a duration field are optimally set according to use, thereby enabling attainment of high-speed transmission.

The time monitoring section 72 is capable of effectively setting a range for high-speed transmission by being provided with the beacon interval monitor 118. The AP 10 is able to transmit two types of beacons based on the IEEE802.11b standard and the IEEE802.11g standard.

According to the wireless communication method, the AP 10 transmits the self-destined, e.g., IEEE802.11b standard-based CTS signal 70, sets the duration time Tb and transmits the beacon 64 based on the IEEE802.11g standard to notify the communications condition. The AP 10 compares and determines the measuring time subsequent to the transmission of the beacon and the duration time Tb. Further, the AP 10 repeats transmission and reception according to the existence of the data based on the IEEE802.11g standard until the measuring time reaches the duration time Tb. When the measuring time is greater than the duration time Tb, the AP 10 transmits the self-destined CTS signal 70 based on the IEEE802.11g standard to thereby set the duration time Tg. Then, the AP 10 transmits the beacon 66 based on the IEEE802.11b standard to notify the communications condition. Thereafter, the AP 10 compares and determines the measuring time subsequent to the transmission of the beacon and the duration time Tg and repeats transmission and reception according to the existence of the data based on the IEEE802.11b standard until the measuring time reaches the duration time Tg. The dedicated transmission periods based on the respective standards can be provided according to the process for returning the routine procedure or processing to the first process step when the measuring time is greater than the duration time Tg. It is thus possible to achieve high-speed transmission as compared with the conventional method. In particular, only the AP 10 transmits the self-destined CTS signal 70 and needs not to transmit the self-destined CTS signal for each packet in plural form as in a manner that already exists above. Thus, the AP 10 prevents the occurrence of a collision and merely transmits one self-destined CTS signal during the period set by the user within the duration field. It is therefore possible to reduce the number of times the self-destined CTS signal is transmitted, and improve a transmission rate.

Also the present method is characterized by providing a process for counting the number of repetitions N between Steps S10 and S14, integrating transmit-receive data amounts SUM_G and SUM_B with their repetitive transmission and reception, determining whether the number of repetitions N is greater than a predetermined count value CYC_NUM when the time to be measured is greater than the duration time Tg, averaging the transmit-receive data amounts SUM_G and SUM_B respectively when a condition for its determination is satisfied, comparing whether either of the averaged transmit-receive data amounts SUM_G and SUM_B is large, converting them to times, determining the difference between the time-converted times and the result of comparison between their magnitudes as comparative information 108, increasing and decreasing the comparative information at a predetermined rate relative to the present rate according to whether the comparative information 108 is greater than a predetermined value to thereby decide duration times Tb and Tg respectively, re-setting them, resetting the number of repetitions N and the transmit-receive data amounts SUM_G and SUM_B, repeating the above processing from the beginning, returning the present processing to the first processing when the number of repetitions N is less than the predetermined count value CYC_NUM to thereby provide dedicated transmission periods based on the respective standards, thereby reducing the number of times the CTS signal 70 is transmitted and optimally variably-setting the duration times set to the duration field according to use, thus making it possible to achieve high-speed transmission.

Further, the present method is capable of monitoring time elapse of a beacon interval set in advance between Steps S14 and S16, transmitting a beacon according to the time elapse of the set beacon interval, proceeding to Step S16 when the time elapse is less than the beacon interval and setting a dedicated transmission period based on IEEE802.11g so as to increase it.

While the preferred forms of the present invention have been described, it is to be understood that modifications will be apparent to those skilled in the art without departing from the spirit of the invention. The scope of the invention is to be determined solely by the following claims.

What is claimed is:

1. A wireless communication apparatus having a function of relaying data communications among stations included in a basic service set in an environment under which first and second standards of a wireless network using the same frequency band are existent in mixed form, said wireless communication apparatus comprising:

reception detecting means for detecting reception of data based on the first and second standards;

transmission detecting means for detecting transmission of the data based on the first and second standards; and control means for controlling said reception detecting means and said transmission detecting means, wherein said control means includes signal generating means for generating a self-destined transmit enabling signal including a set time based on either of the first and second standards, of transmit enabling signals, and time monitoring means for controlling generation of the self-destined transmit enabling signal, wherein said time monitoring means includes beacon transmitting means for transmitting beacons based on the first and second standards, and time monitoring means for monitoring elapse of the set times corresponding to the first and second standards and generating and outputting transmission control signals for transmitting the beacons according to the elapse of the set time, and wherein said control means further includes averaging means for averaging times used for transmission and reception, based on the first and second standards respectively, comparing means for determining which one of the averaged times for transmission and reception is large and obtaining a difference between the times as comparative information, and time deciding means for increasing and decreasing the comparative information at a predetermined rate relative to the present rate according to whether the comparative information is larger than a predetermined value to determine set times and outputting the same to said time monitoring means.

2. The wireless communication apparatus according to claim 1, wherein said time monitoring means includes interval monitoring means for monitoring a transmission interval between the beacons.

3. The wireless communication apparatus according to claim 2, wherein the first standard is an IEEE (Institute of Electrical and Electronics Engineers) 802.11 b standard, and the second standard is an IEEE802.11g standard, and the second standard is an IEEE802.11 g standard.

4. A wireless communication method for relaying data communications among stations including in a basic service set in an environment under which first and second standards of a wireless network using the same frequency band are existent in mixed form, comprising:

a first step for allowing an access point to transmit a self-destined transmit enabling signal and setting a first time corresponding to a duration time based on the first standard;

a second step for transmitting a beacon based on the second standard;

a third step for comparing and determining a measuring time subsequent to the transmission of the beacon and the first time;

a fourth step for repeating transmission and reception according to the existence of data based on the second standard until the measuring time reaches the first time;

a fifth step for transmitting a self-destined transmit enabling signal when the measuring time is greater than the first time and setting a second time corresponding to duration time based on the second standard;

a sixth step for transmitting a beacon based on the first standard;

a seventh step for comprising and determining a measuring time subsequent to the transmission of the beacon and the second time;

an eighth step for repeating transmission and reception according to the existence of data base on the first standard until the measuring time reaches the second time; and an ninth step for returning processing to the first step when the measuring time is greater than the second time, wherein the method further includes, between the first and third steps, a tenth step for counting the number of repetitions;

an eleventh step for integrating transmit/receive data accompanying transmission and reception thereof repeated by the fourth step as first integrated data; and a twelfth step for integrating transmit/receive data accompanying transmission and reception thereof repeated by the eighth step as second integrated data; and wherein said ninth step includes:

a thirteenth step for determining whether the number of repetitions is greater than a predetermined count value when the measuring time is greater than the second time;

a fourteenth step for averaging the first and second integrated data respectively when the number of repetitions is greater than the predetermined count value;

a fifteenth step for comparing whether either of the averaged first and second integrated data is large, time-converting the averaged first and second integrated data respectively, and determining the different between the time-converted tines and the result of comparison as comparative information;

a sixteenth step for increasing and decreasing the comparative information at the predetermined rate relative to the present rate according to whether the comparative information is larger than a predetermined value, to thereby decide first and second times and reset the same;

a eighteenth step for returning processing to the first step when the number of repetitions is less than the predetermined count value.

5. The wireless communication method according to claim 4, further including between the third step and the fourth step, a nineteenth step for monitoring time elapse of a beacon interval set in advance, and a twenties step for transmitting each of the beacons according to the time elapse of the set beacon interval, wherein when the time elapse is less than the set beacon interval, processing is advanced to the fourth step.

6. The wireless communication method according to claims 4 or 5, wherein the first standard is an IEEE (Institute of Electrical and Electronics Engineers) 802.11 b standard, and the second standard is IEEE8802.11g standard.

* * * * *